Oct. 13, 1931.  C. STANSBURY  1,826,963
CONTROLLER FOR INDUCTION MOTORS
Filed June 15, 1929
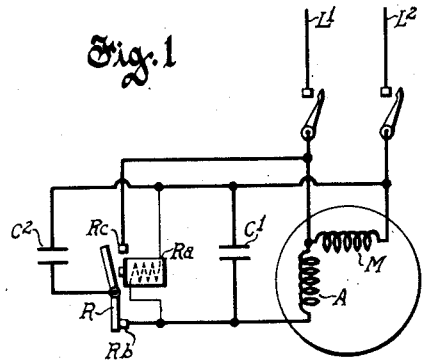
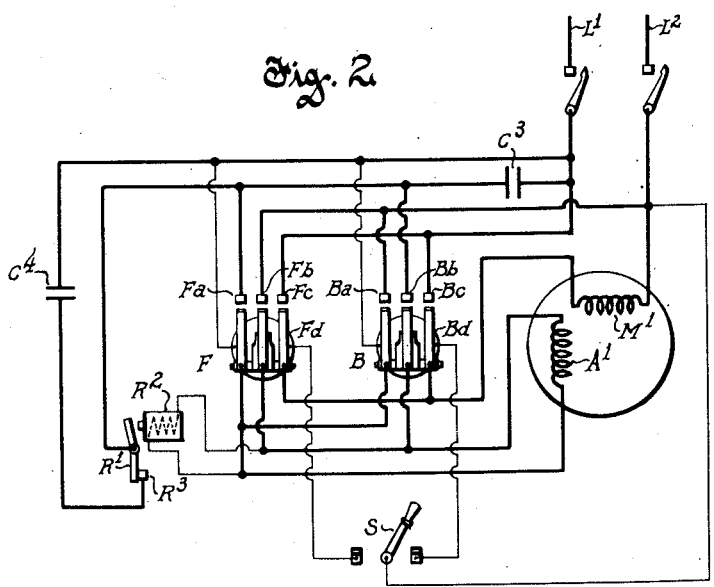
INVENTOR.
Carroll Stansbury
BY
ATTORNEY Patented Oct. 13, 1931

1,826,963

UNITED STATES PATENT OFFICE

CARROLL STANSBURY, OF WAUWATOSA, WISCONSIN, ASSIGNOR TO CUTLER-HAMMER, INC., OF MILWAUKEE, WISCONSIN, A CORPORATION OF DELAWARE

CONTROLLER FOR INDUCTION MOTORS

Application filed June 15, 1929. Serial No. 371,140.

This invention relates to controllers for induction motors and particularly for split phase motors, such as disclosed in the Bailey Patent No. 1,707,424.

Such single phase motors have two windings connected in parallel, one winding being connected directly across the line, while a condenser is connected in series with the second winding, to cause the current in the second winding to lead the current in the first winding by substantially ninety degrees. In order to produce the most favorable starting and running conditions, the capacity connected in series with the second winding should have a relatively high value during the starting period and relatively low value after the motor has reached normal running speed.

An object of the invention is to provide automatic means for controlling the condenser capacitance during starting and normal running of the motor.

Another object of the invention is to provide control means for commutating the condenser connections in response to a voltage induced in the windings of the motor.

Another object of the invention is to provide a controller for commutating the condenser in response to the load on the motor.

Another object is to provide a controller for insuring reversal of rotation of the motor, when the connections of one of the windings are reversed relative to the connections of the other winding, and further to insure a maximum torque of the motor during the reversal period.

Another object of the invention is to provide for maximum power factor of the current taken by the motor during starting.

Further objects and advantages will be apparent from the specifications and accompanying drawings of which, Figure 1 shows diagrammatically a controller for starting a split phase motor which always operates in the same direction of rotation, while, Fig. 2 illustrates diagrammatically a controller for a similar motor, the direction of rotation of which may be reversed.

Referring to Fig. 1, the motor has a main winding M and auxiliary winding A. The main winding M is directly connected across the line, while the connections of the auxiliary winding will be more fully described. The controller further includes condensers $C^1$ and $C^2$ and a relay R, the latter having a magnet winding $R^a$, a normally closed contact $R^b$ and a normally open contact $R^c$.

The condenser $C^1$ is connected between the line $L^2$ and one terminal of the auxiliary winding A, while the other terminal of said winding is connected to the line $L^1$. The winding $R^a$ of relay R is connected in parallel with condenser $C^1$ while condenser $C^2$ is connected between the line $L^2$ and the pivot of relay R. The stationary contact $R^b$ is connected to the free end of the auxiliary winding A, while the stationary contact $R^c$ is connected to the line $L^1$.

The controller operates as follows:

When the switch from the lines $L^1$ and $L^2$ is closed, current flows from the line $L^1$ to line $L^2$ through the winding M and also through the winding A and condenser $C^1$. As the contact $R^b$ of relay R is closed, the condenser $C^2$ is connected in parallel with condenser $C^1$ and part of the current of the winding A flows through the condenser $C^2$. The coil $R^a$ of relay R is connected in parallel with the condensers $C^1$ and $C^2$. It is obvious, that at the moment of starting the voltage across these condensers and hence the voltage impressed upon the coil $R^a$ is approximately equal to full line voltage and the relay R is so adjusted that it does not attract its armature at that voltage. The current flowing in the winding A by virtue of the condensers $C^1$ and $C^2$ is approximately ninety degrees out of phase with respect to the current in the winding M. As the motor accelerates, a counter-electromotive-force is induced in the winding A, which increases the voltage across the condensers $C^1$ and $C^2$. When the motor has reached a certain speed, the voltage has risen to a point, at which the relay R, if properly adjusted, attracts its armature, thereby opening the contact $R^b$ and disconnecting the condenser $C^2$ from the winding A. At the same moment the contact $R^c$ is closed so that now the condenser $C^2$ is directly connected across the lines $L^1$ and $L^2$, taking from these lines a leading current, which improves the power factor of the total current taken by the motor and condensers. By connecting the relay across the condenser $C^1$ provision is made whereby in case the load on the motor increases, resulting in a decrease of the induced voltage, the relay winding remains sufficiently energized, to prevent repeated connection and disconnection of the condenser $C^2$ from the motor circuit.

It should be pointed out that the contact $R^c$ may, if desired, be omitted from the relay R, so that condenser $C^2$ is completely disconnnected from the circuit, after the motor has accelerated.

Fig. 2 illustrates a controller for reversing the direction of rotation of the motor. It is well known, that when the ordinary split phase motor without condensers has been brought up to speed, and the auxiliary winding is suddenly reversed before the motor has had time to slow down in speed, the motor continues to rotate in the same direction and does not reverse. In the scheme illustrated in Fig. 2 this difficulty is obviated by temporarily disconnecting both windings and the relay from the line and immediately thereafter reconnecting them, but with the auxiliary winding reversed, relative to the main winding. If upon reversal of the auxiliary winding of the motor the condenser capacity is raised to the value required for starting, the torque produced is in a reverse direction, so that the motor slows down and ultimately reverses its direction of rotation. To obtain the desired result the voltage responsive relay is connected across the auxiliary winding of the motor and is so adjusted, that after it once has responded to the voltage impressed upon its winding, it will keep its armature attracted until the voltage of the auxiliary winding has reached a very low value.

When for the purpose of reversal the motor windings are temporarily disconnected from the line, the relay winding is also deenergized and releases its armature. Upon reconnection of the motor winding for reverse rotation, the voltage acting upon the relay is not sufficiently high to cause it to operate and the armature remains in the released position, until the motor has reversed and reaches a sufficiently high speed in the reverse direction.

The motor illustrated in Fig. 2 is identical with that of Fig. 1. The controller consists of two triple pole magnet switches F and B respectively, having three normally open contacts $F^a$, $F^b$ and $F^c$ and $B^a$, $B^b$ and $B^c$ and magnet windings $F^d$ and $B^d$. Further there is provided a relay $R'$ having a magnet winding $R^2$ and a normally closed contact $R^3$, and two condensers $C^3$ and $C^4$, the former being in circuit continuously when the motor is operating, while the latter is employed only during the starting and reversing period of the motor. A pilot switch S, having two magnets for selectively closing the energizing circuit of the magnet switches F and B provides for the control of the latter.

The controller operates as follows:

If the switch connecting the motor winding to the lines $L^1$ and $L^2$ is closed and the pilot switch S is thrown to the left, the magnet winding $F^c$ of the switch F is energized, thereby causing closure of the contacts $F^a$, $F^b$ and $F^c$. The main winding $M'$ of the motor is thus connected directly across the lines $L^1$ and $L^2$ through contact $F^c$. A further circuit is completed from the line $L^1$, through the condenser $C^3$, through the switch contact $F^a$, the winding $A'$, through switch contact $F^b$ to the line $L^2$. The winding $R^2$ of relay $R'$ is in parallel with the winding $A'$ and both are in series with the condenser $C^3$, while the condenser $C^4$ is connected in parallel with the condenser $C^3$ through the contact $R^3$ of relay $R'$. At the moment when the motor is energized, the voltage across the winding $A'$ and hence the voltage of the winding $R^2$ is zero, but as the motor accelerates gradually an electro-motive-force is induced in winding $A'$, until it ultimately reaches the value for which the relay $R'$ is adjusted, and at which it responds to attract its armature, thereby opening the contact $R^3$ and disconnecting the condenser $C^4$ from the line. As long as the voltage induced in the winding $A'$ is higher than the voltage at which the relay $R^2$ responds, the condenser $C^4$ remains disconnected. The relay may be adjusted so that in case of a heavy load on the motor which results in a slowing down of its speed and thus in a material decrease of the voltage induced in the winding $A'$, it releases its armature and recloses contact $R^4$. This reconnects the condenser $C^4$ in parallel with $C^3$, resulting in an increase of the torque of the motor and thus permitting it to carry the heavier load without being stalled. Upon the reduction of the load the motor again speeds up, thereby increasing the voltage across the coil $A'$ and causing the relay to disconnect the condenser $C^4$.

If it is desired to reverse the motor the switch S is thrown in the reverse direction, thereby deenergizing the magnet switch F and energizing the magnet switch B. The current flowing through the winding $A'$ is thereby reversed. Also upon reversal of the switch S the relay $R^2$ is temporarily deenergized and closes contact $R^3$, thereby reconnecting condenser $C^4$ in circuit. The total capacity in series with the winding $A'$ is thus increased to a maximum, resulting in a reversal of the torque produced by the motor which causes the latter to slow down and stop and ultimately to accelerate in the reverse direction. Upon attainment of the proper speed the relay R² again attracts its armature thereby disconnecting the condenser C⁴ from circuit.

It is of course obvious, that the relay R² may also be provided with a normally open contact similar to that shown in Fig. 1, so that the condenser C⁴ illustrated in Fig. 2 may be connected across the line during the period of normal operation of the motor, to thereby increase the power factor of the total current from the line.

What I claim as new and desire to secure by Letters Patent is:

1. In a controller for an induction motor having two primary windings, in combination, a condenser permanently connected in series with one of said windings, a second condenser and a relay responsive to a voltage induced in said last mentioned winding, said relay being adapted to connect said second condenser in the circuit of said last mentioned winding in parallel with said first condenser, and alternatively remove it from said last mentioned circuit, and means to bring the motor to rest by plugging, said means comprising a pair of normally open electro-magnetic switches for controlling the connection of the motor to the source of supply and for reversing one of said windings with respect to the other winding.

2. In a controller for an induction motor having two primary windings, in combination, a condenser permanently connected in series with one of said windings, a second condenser and a relay responsive to a voltage induced in said last mentioned winding, said relay being adapted to connect said second condenser in parallel with said first condenser and in circuit with said last mentioned winding, and alternatively in parallel with the other of said primary windings, and means to bring the motor to rest by plugging, said means comprising a pair of normally open electro-magnetic switches for controlling the connection of the motor to the source of supply and for reversing one of said windings with respect to the other winding.

3. In a controller for an induction motor having two primary windings, in combination, a condenser, a relay responsive to a voltage induced in one of said windings and controlling circuit connections for connecting said condenser in circuit with one of said windings and for alternatively disconnecting it from circuit, and means to bring the motor to rest by plugging, said means comprising a pair of normally open electro-magnetic switches for controlling the connection of the motor to the source of supply and for reversing one of said windings with respect to the other winding.

4. In a controller for an induction motor having two primary windings, in combination, a condenser, a relay responsive to a voltage induced in one of said windings and controlling circuit connections for connecting said condenser in parallel with said one winding and alternately in parallel with the other winding, and means to bring the motor to rest by plugging, said means comprising a pair of normally open electro-magnetic switches for controlling the connection of the motor to the source of supply and for reversing one of said windings with respect to the other winding.

5. In a controller for an induction motor having two primary windings, in combination, capacitance in circuit with one of said windings, means responsive to a voltage induced in one of said windings and having circuit connections for varying said capacitance in accordance with said voltage and means to bring the motor to rest by plugging, said last mentioned means comprising a pair of normally open electro-magnetic switches for controlling the connection of the motor to the source of supply and for reversing one of said windings with respect to the other winding.

6. In a controller for an induction motor having two primary windings, in combination, capacitance in circuit with each of said windings, means responsive to a voltage induced in one of said windings and having circuit connections for varying the capacitances in the respective circuits in accordance with said voltage, and means to bring the motor to rest by plugging, said last mentioned means comprising a pair of normally open electro-magnetic switches for controlling the connection of the motor to the source of supply and for reversing one of said windings with respect to the other winding.

In witness whereof, I have hereunto subscribed my name.

CARROLL STANSBURY.